(12) United States Patent
Venckus et al.

(10) Patent No.: US 11,430,646 B2
(45) Date of Patent: Aug. 30, 2022

(54) ATMOSPHERIC PRESSURE ION SOURCE INTERFACE

(71) Applicant: Thermo Fisher Scientific (Bremen) GmbH, Bremen (DE)

(72) Inventors: Aivaras Venckus, Oldenburg (DE); Hamish Stewart, Bremen (DE); Christian Albrecht Hock, Bremen (DE); Jan-Peter Hauschild, Weyhe (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 2 days.

(21) Appl. No.: 17/089,424

(22) Filed: Nov. 4, 2020

(65) Prior Publication Data

US 2021/0142997 A1 May 13, 2021

(30) Foreign Application Priority Data

Nov. 8, 2019 (GB) ...................................... 1916253

(51) Int. Cl.
*H01J 49/00* (2006.01)
*H01J 49/04* (2006.01)
*G01N 27/622* (2021.01)
*H01J 49/14* (2006.01)
*H01J 49/16* (2006.01)
*H01J 49/24* (2006.01)
*H01J 49/40* (2006.01)
*H01J 49/42* (2006.01)

(52) U.S. Cl.
CPC ........ *H01J 49/0495* (2013.01); *G01N 27/622* (2013.01); *H01J 49/004* (2013.01); *H01J 49/145* (2013.01); *H01J 49/162* (2013.01); *H01J 49/164* (2013.01); *H01J 49/165* (2013.01); *H01J 49/24* (2013.01); *H01J 49/408* (2013.01); *H01J 49/4225* (2013.01)

(58) Field of Classification Search
CPC ........ H01J 49/00; H01J 49/02; H01J 49/0495; H01J 49/004; H01J 49/145; H01J 49/162; H01J 49/164; H01J 49/165; H01J 49/24; H01J 49/408; H01J 49/4225; H01J 49/0404; H01J 49/0468; H01J 49/066; H01J 49/045; H01J 49/167; H01J 49/26; G01N 27/622
USPC ......................................... 250/281, 282, 288
See application file for complete search history.

(56) References Cited

U.S. PATENT DOCUMENTS 3,913,174 A * 10/1975 Paoli .................. A22C 21/0092
452/128
6,583,408 B2 6/2003 Smith et al.
(Continued)

*Primary Examiner* — Jason L McCormack
(74) *Attorney, Agent, or Firm* — David A. Schell

(57) ABSTRACT

An interface for receiving ions in a carrier gas from an atmospheric pressure ion source at a spectrometer that is configured to analyse the received ions at a lower pressure includes an interface vacuum chamber having a downstream aperture; a support assembly defining an axial bore arranged to allow a removable capillary tube to extend therethrough; ions being received from the atmospheric pressure ion source through the capillary tube and directed towards the downstream aperture; and a jet disruptor, positioned downstream from the axial bore and configured to disrupt gas flow between the axial bore and the downstream aperture only when the capillary tube is not fully inserted through the axial bore.

17 Claims, 5 Drawing Sheets

(56) References Cited

U.S. PATENT DOCUMENTS

| | | | |
|---|---|---|---|
| 6,667,474 B1* | 12/2003 | Abramson | H01J 49/0404 |
| | | | 250/288 |
| 8,242,440 B2 | 8/2012 | Splendore et al. | |
| 2006/0108520 A1* | 5/2006 | Park | H01J 49/107 |
| | | | 250/287 |
| 2015/0233866 A1* | 8/2015 | Verenchikov | H01J 49/40 |
| | | | 250/282 |

\* cited by examiner

ATMOSPHERIC PRESSURE ION SOURCE INTERFACE

TECHNICAL FIELD OF THE DISCLOSURE

The disclosure relates to an interface for receiving ions in a carrier gas from an atmospheric pressure ion source at a spectrometer (for example, a mass spectrometer or ion mobility spectrometer) that is configured to analyse the received ions at a lower pressure and a spectrometer comprising such an interface.

BACKGROUND TO THE DISCLOSURE

In mass spectrometers, samples can be investigated to analyse the mass-to-charge (m/z) ratio of ions of the sample. The sample is often ionised in an atmospheric pressure ion source. In atmospheric pressure ion sources, the ions of the sample are generated at a pressure, which is in the range of atmospheric pressure, though depending on the ion source design, the range of pressure may deviate somewhat from that of the surrounding atmosphere. This class of ion sources may include: an Electrospray Ionization (ESI) source; an Atmospheric Pressure Chemical Ionization (APCI) source; an Atmospheric Pressure Matrix-assisted laser desorption/ionization (AP-MALDI) source; and an Atmospheric Pressure Photoionisation (APPI) source. Also, the ESI source can be a Heated Electrospray Ionization (HESI) source.

Mass spectrometers commonly involve ionisation of sample from a gas phase or liquid phase which can be provided, for example, by a nozzle and/or a needle. The ionisation of sample from a liquid phase may provide a spray, preferably of uncharged or charged droplets. Ions are typically admitted to an interface of the mass spectrometer, comprising an interface vacuum chamber, via a conductance restricting capillary. The ions are then transmitted through stages of differential pumping into a higher vacuum, having a lower pressure. As the capillary becomes contaminated over time it is preferred that this be replaceable without breaking the vacuum of the instrument. Protecting the instrument from vacuum failure during this procedure is important, to avoid the need to re-establish the vacuum after baking out the instrument, which would typically incur a day in which the instrument could not be used for measurements.

A known method to protect the vacuum is to install a small gate valve in front of the capillary that may be manually closed before capillary removal. This method is used on commercial instruments, including a "6545 Q-TOF" marketed by Agilent Technologies, Inc. Including such valves can be expensive, the valve may be bulky, it may increase the complication of the capillary replacement procedure and compromise the performance of the mass spectrometer.

Another protection method is to ensure that sufficient conductance restriction remains in the interface when the capillary is removed and pumping to tolerate the extra gas load for short periods. This may also compromise performance, due to the position of conductance restricting parts, which may include parts in front of the capillary. It may further add the risk of the capillary bore being left open for extended periods by the user. In addition, some restrictions may be introduced on the radius of the capillary, to allow the surrounding bore to remain small. Alternatively, excess pumping capacity may be needed, which is expensive.

An improvement is described in U.S. Pat. No. 6,667,474, in which a ball valve is provided in a support assembly for the capillary, pushing against the body of the capillary in such a way that the valve would automatically close and seal the atmospheric interface when the capillary is removed, and open upon insertion of the capillary. This approach has been found to work well, but the vacuum protection remains sub-optimal during the removal of the capillary. In this state, a jet of gas might reach a vacuum chamber that is downstream from the interface vacuum chamber (that is, the chamber into which the capillary projects). Accordingly, excess pumping capacities must be provided to this downstream vacuum chamber, which the gas jet might unintentionally reach. Improving protection of the vacuum without significantly adding to the cost and complexity of the instrument is therefore highly desirable.

SUMMARY OF THE DISCLOSURE

Against this background, there is provided an interface for receiving ions in a carrier gas from an atmospheric pressure ion source at a spectrometer (for instance, a mass spectrometer or ion mobility spectrometer) that is configured to analyse the received ions at a lower pressure in accordance with claim 1 and a spectrometer (mass spectrometer or ion mobility spectrometer) in accordance with claim 15. Further features of the disclosure are detailed in dependent claims and discussed herein.

The inventors have discovered that vacuum protection at the interface in existing approaches is not ideal because, even with an automatic vacuum protection valve, such as a ball valve, a jet of ions may still flow under specific circumstances into the interface vacuum chamber (that is, the jet may flow downstream of the support assembly) when the capillary is inserted or removed. This jet may interfere with the ion transmission optics and put additional gas load into downstream pumping regions via the downstream aperture. Therefore, the disclosure provides a device to block the gas jet, a jet disruptor. This device is only applied (that is, disrupts gas flow) during the vulnerable period of retraction and/or insertion of the capillary, but is not applied (or advantageously removed) during normal operation, when the capillary tube is fully inserted through the axial bore. The jet disruptor may close the downstream end of the capillary as soon as movement of the capillary starts.

The approach disclosed herein reduces the risk of a vacuum disruption during movement of the capillary. It is simple and inexpensive to implement and does not affect instrument performance during operation.

The jet disruptor is preferably retractable from a position in which it disrupts gas flow when the capillary tube is not fully inserted to a position in which it does not disrupt gas flow when the capillary tube is fully inserted. For example, the jet disruptor may rest in a position to disrupt gas flow and be resiliently biased against displacement from that position upon insertion of the capillary, for example by means of a spring or other elastic mechanism or by means of automatic (for instance, electronic) control. The jet disruptor may be electrically conductive, for example comprising a sheet metal strip, which can effectively disrupt the flow of gas. For instance, one end of the metal strip may be affixed to the support assembly so that a distal portion disrupts gas flow when the capillary tube is not fully inserted through the axial bore. This distal portion may be pushed away or displaced when the capillary tube is fully inserted through the axial bore, so as not to disrupt the gas flow. The distal portion may be coupled to the affixed end by a movable joint and/or the distal portion may be shaped (for example, bent with respect to the affixed portion) for improved disruption of the flow. An end of the axial bore may be bevelled. Then, the sheet metal strip of the jet disruptor may lie flat over the bevelled end of the axial bore, when the capillary tube is not fully inserted through the axial bore. Optionally, the jet disruptor may be resilient to a temperature of at least 200° C.

The jet disruptor is preferably provided in addition to a sealing valve, which seals the interface when the capillary tube is removed. For example, the sealing valve may be a ball valve or an electronically controlled valve. The sealing valve may be located along the axial bore, such that the jet disruptor is between the sealing valve and the downstream aperture. Optionally, the sealing valve may be combined with the jet disruptor in some embodiments. Then, the combined jet disruptor and sealing valve may be located at the end of the axial bore nearest the downstream aperture.

As will be explained below, jet disruptors are known for protecting open interfaces (that is, without a sealing valve) where the capillary opens directly facing a downstream aperture. In preferred embodiments according to the disclosure, the interface is arranged such that the tube opening (that is the bore in which the tube is received) is offset from the downstream aperture. This limits line of sight for gas load and unwanted material such as droplets that may cause contamination of ion optics. The jet disruptor of the present disclosure therefore provides additional protection to the vacuum.

The interface may have further components, for example: an ion funnel, to direct ion flow towards the downstream aperture; and a heated block that is integrated into the support assembly or forming the support assembly and is around the bore in which the capillary is received.

The interface vacuum chamber is desirably maintained at a pressure below atmospheric pressure, for instance by means of a vacuum pumping arrangement.

According to the disclosure, a spectrometer (specifically an ion spectrometer, for example a mass spectrometer or an ion mobility spectrometer) comprising an interface as disclosed herein is also provided. The spectrometer advantageously further comprises an atmospheric pressure ion source, for instance one or more of: an Electrospray Ionization (ESI) source; an Atmospheric Pressure Chemical Ionization (APCI) source; an Atmospheric Pressure Matrix-assisted laser desorption/ionization (AP-MALDI) source; Atmospheric Pressure Photoionisation (APPI) source; and a Heated Electrospray Ionization (HESI) source. Typically, the mass spectrometer further comprises a mass analyser, downstream from the interface, for instance one or more of: a Time-of-Flight (TOF) analyser; a quadrupole mass analyser; a Fourier Transform Mass Spectrometry (FTMS) analyser; an ion trap mass analyser; a magnetic sector mass analyser; and a hybrid mass analyser. In preferred embodiments, the spectrometer is differentially pumped, for instance such that a pressure in a chamber downstream the interface vacuum chamber (for instance, where the mass analyser is located) is lower than the pressure in the interface vacuum chamber.

BRIEF DESCRIPTION OF THE DRAWINGS

The disclosure may be put into practice in a number of ways, and preferred embodiments will now be described by way of example only and with reference to the accompanying drawings, in which.

DETAILED DESCRIPTION OF PREFERRED EMBODIMENTS

Figure 1:
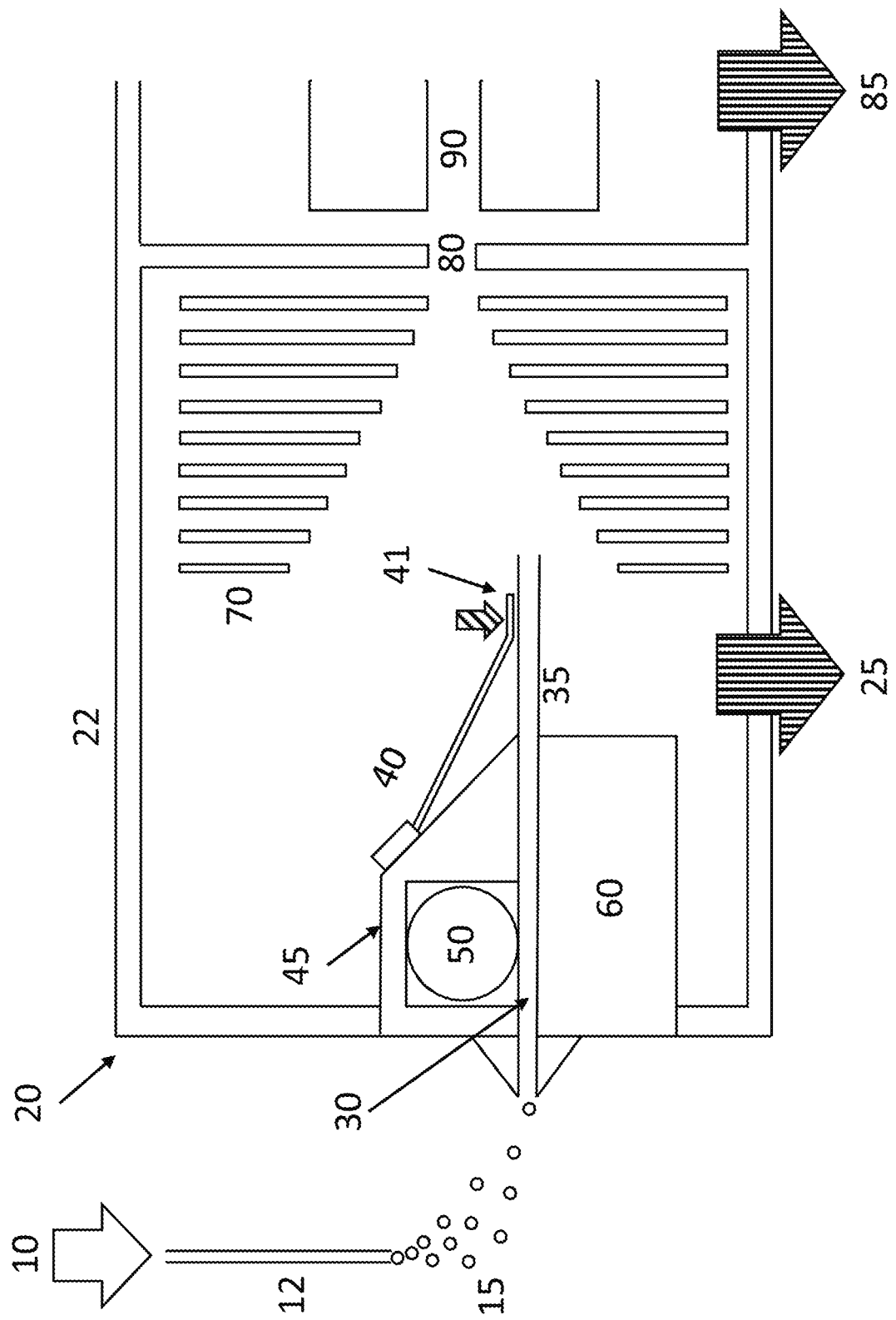
FIG. 1 schematically shows an interface for receiving ions from an atmospheric pressure ion source at a mass spectrometer, in accordance with an embodiment of the disclosure.

A basic embodiment comprises a known interface for receiving ions from an atmospheric pressure ion source at a mass spectrometer, with the addition of a jet disruptor that only disrupts gas flow when the capillary is not fully inserted into the interface. Advantageously, the jet disruptor is retracted out of the path of ions when capillary is fully inserted. When the capillary is retracted, the jet disruptor may move down into the path of the gas flow to break the jet and limit the quantity of gas breaking through to the next vacuum region. Under normal operation, the jet disruptor beneficially does not interact with gas flows or ion transmission.

As noted above, jet disruptors are known, for example in U.S. Pat. No. 6,583,408. This describes a fixed jet disruptor located within an electrodynamic ion funnel, blocking line of sight between the inlet capillary and the aperture to the next vacuum stage. This is intended to aid separation of desolvated ions from droplets and carrier gas, as well as reduce the gas load in downstream vacuum stages. This device also blocks line of sight for ion transmission. The jet disruptor may also increase the danger of contamination and charging, along with general complexity and cost. Moreover, the capillary (or rather the axial bore into which the capillary is inserted) is commonly offset somewhat compared to the next downstream aperture. This limits line of sight for gas load and unwanted material such as droplets that may cause contamination of ion optics. In this case, a jet disruptor of the type described in U.S. Pat. No. 6,583,408 is of little benefit.

The advantage of a jet disruptor in accordance with the disclosure, in which the gas flow is only disrupted when the capillary is not fully inserted into the interface, but advantageously not disrupted when the capillary is fully inserted, is that the vacuum is significantly better protected. By preventing a jet of ions from flowing into the interface vacuum chamber when the capillary is not completely inserted or removed, interference with the ion transmission optics and the gas load into downstream pumping regions are both reduced. These advantages apply when no other form of vacuum protection is provided, but are even greater when a sealing valve is provided to seal the bore into which the capillary is inserted and/or the bore and downstream aperture are offset with respect to one another.

In a generalized sense, there may be considered an interface for receiving ions in a carrier gas from an atmospheric pressure ion source at a spectrometer (typically, a mass spectrometer or ion mobility spectrometer). The spectrometer is configured to analyse the received ions at a lower pressure. The interface comprises: an interface vacuum chamber having a downstream aperture; a support assembly defining an axial bore arranged to allow a removable capillary tube to extend therethough; and a jet disruptor, positioned downstream from the axial bore and configured to disrupt gas flow between the axial bore and the downstream aperture only when the capillary tube is not fully inserted through the axial bore. Ions are advantageously received from the atmospheric pressure ion source through the capillary tube and directed towards the downstream aperture. Beneficially, the jet disruptor is configured not disrupt gas flow between the axial bore and the downstream aperture when the capillary tube is fully inserted through the axial bore.

In a further generalized aspect, there may be considered a spectrometer, comprising: an atmospheric pressure ion source; and an interface for receiving ions in a carrier gas from the atmospheric pressure ion source, according to any such interface disclosed herein. The downstream aperture of the interface separates the interface chamber from a downstream chamber. One or more further ion optical devices may be provided in the downstream chamber. The mass spectrometer may further comprise a mass analyser, downstream from the interface.

A method of manufacturing and/or operating an interface for a spectrometer and/or a spectrometer having steps corresponding with the actions of specific features or components described herein may additionally be considered. Additional generalized aspects, including preferred and/or optional features will be described below. Specific embodiments are first described.

With reference to FIG. 1, there is schematically shown an example interface for receiving ions from an atmospheric pressure ion source at a mass spectrometer. The interface 20 comprises: an interface vacuum chamber 22 having a downstream aperture 80; a support assembly 45 comprising an axial bore 30 for receiving a transport capillary 35 and a heated block 60; a retractable jet disruptor 40; a ball valve 50; and an ion funnel 70. In this embodiment, the ion sample 10 is provided to an atmospheric pressure Electrospray Ionization (ESI) needle 12 and the resultant spray 15 flows through the capillary 35. The interface 20 is kept at a pressure below atmospheric by vacuum pumping 25.

In the position shown in FIG. 1, the jet disrupter is retracted and does not disrupt the flow of gas. Moreover, insertion of the capillary opens the ball valve 50, so this also provides no disruption. The ions flow through the capillary 35, the ion funnel 70 and the downstream aperture 80 (or exit orifice) to capture and transmit ions across a vacuum region to downstream ion optics 90 (such as a quadrupole ion guide). The downstream ion optics 90 is in a separate chamber from the interface vacuum chamber 22 of the interface 20 and is kept at a lower pressure than in the interface 20 by vacuum pumping 85. In other words, the vacuum chamber is differentially pumped.

The heated block (which uses resistive electrical heating in this embodiment) aids the desolvation of ions from water droplets within the transfer capillary 35. The capillary 35 is supported within the support assembly 45, which incorporates the ball valve 50 to seal the inlet on removal of the capillary. The support assembly 45 also supports the jet disruptor 40 which rests upon the capillary by a bent end portion 41 and moves down in front of the capillary when the capillary is withdrawn. The jet disrupter 40 typically disrupts the jet of ions when over 20% of the length of the capillary 35 is withdrawn from the axial bore 30, more preferably when over 10% of the length of the capillary 35 has been withdrawn and particularly when over 5% of the length of the capillary 35 has been withdrawn. Hence, the jet disrupter 40 may start to affect the flow of gas even when only a small portion of the capillary 35 has been withdrawn. Typically, the jet disrupter disrupts the jet of the ions when over 5 mm of the capillary 35 has been withdrawn, more preferably when over 2 mm of the capillary 35 has been withdrawn and particularly when over 1 mm of the capillary 35 has been withdrawn.

Figure 2A:
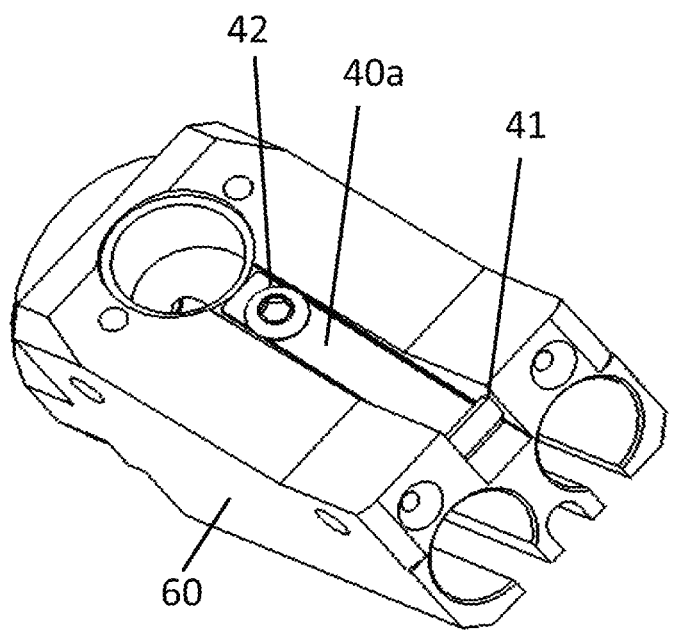
FIGS. 2a and 2b depict perspective views of a portion of an interface in accordance with FIG. 1 comprising a jet disruptor in (a) an active position and (b) a retracted position.
Figure 2B:
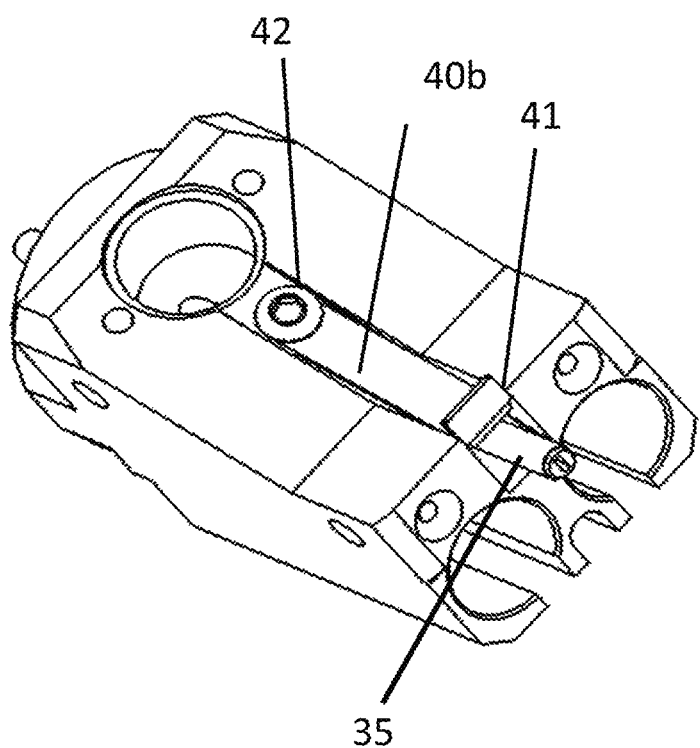
Figure 3A:
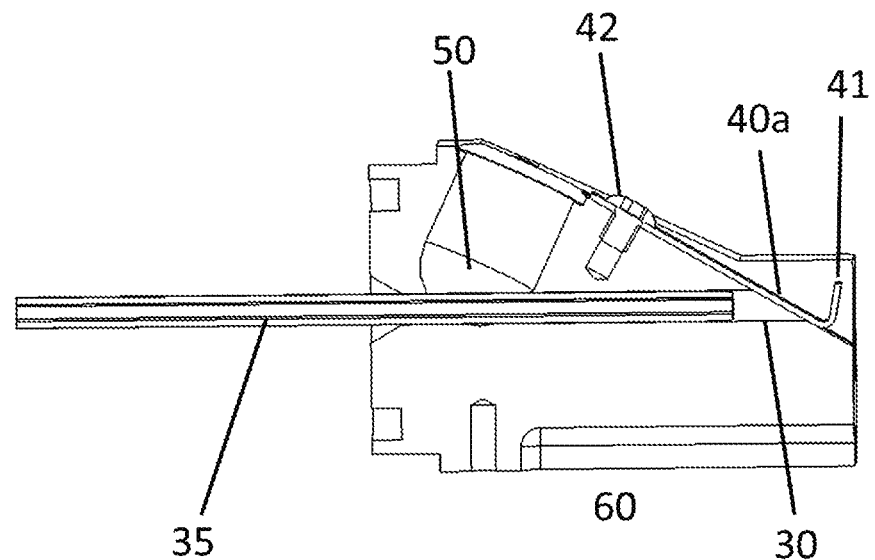
FIGS. 3a and 3b illustrate cross-sectional views of a portion of an interface in accordance with FIG. 1 comprising a jet disruptor in (3a) an active position and (3b) a retracted position.
Figure 3B:
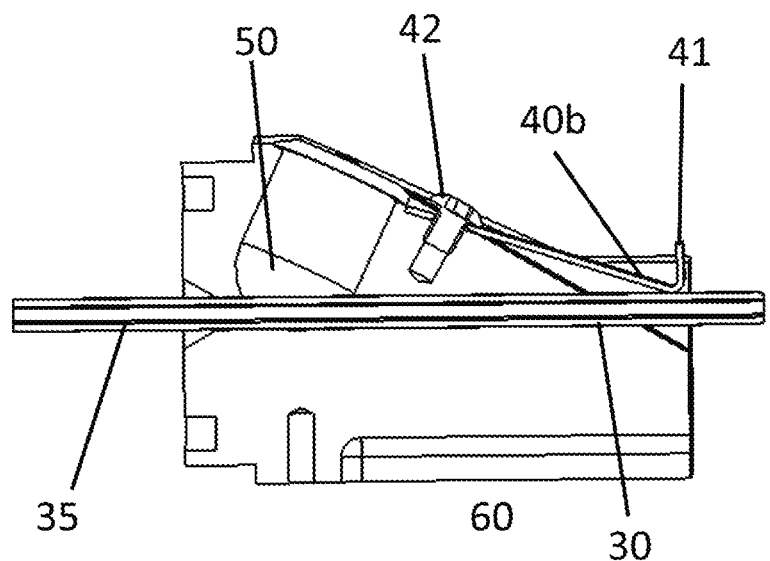

Referring next to FIG. 2, there is depicted a perspective view of a portion of an interface in accordance with FIG. 1 comprising a jet disruptor in (a) an active position and (b) a retracted position. Reference is also made to FIG. 3, in which a cross-sectional view of the portions shown in FIG. 2 are illustrated, although in FIG. 3(*b*), the capillary 35 is not removed. The same reference numerals are used as employed in FIG. 1. These drawings are an example of a capillary housing (which in this case comprises the heated block 60) incorporating the jet disruptor 40 in accordance with the disclosure. Here, the jet disruptor 40 is a thin strip of cut sheet metal, one end 42 of which (distal the bent end 41) is attached to the support assembly 45, in particular the heated block 60. The jet disruptor 40 is advantageously made from spring steel. The end of the axial bore 30 (or rather the portion of the heated block where the axial bore ends) is bevelled, such that the end face of the axial bore is slanted. The end of the capillary 35 is typically not bevelled.

The jet disruptor 40*a* in the active position, hangs down in front of the retracted capillary. When the capillary 35 is inserted it pushes the jet disruptor 40*b* to the retracted position up and out of the path of gas. The sheet metal of the jet disruptor 40 is screwed to the heated block 60 that surrounds the capillary body 35 and doubles as an electrical contact between the two. The jet disruptor 40 comprises a relatively long straight section, generally parallel with the (bevelled) side of the heated block 60. The long straight section of the jet disruptor 40 comprises the screwed end of the metal sheet. The other end of the jet disruptor 40 comprises a bent portion, which is angled with respect to the long straight section away from the side of the heated block 60.

In this design, the jet disruptor 40 therefore comprises a metal object on the end of a spring device (in this case, a consequence of the use of spring steel for the jet disruptor 40), which can apply a (resilient bias) force when the capillary tube 35 is retracted. The force to retract the jet disrupter is applied by the capillary 35 during its insertion. The jet disruptor 40 is extended over the heating block 60 to disrupt the gas flow at the beginning of the movement of the capillary 35. As shown, the top end 41 of the jet disruptor 40 is bent to but parallel against at the outer surface of the capillary tube 35.

Thus, the jet disruptor 40 shown in this design does not seal the atmospheric interface. The design shown in FIGS. 2 and 3 covers the axial bore 30, but without the force or sealing parts required to prevent gas flow fully. FIG. 3(*a*) shows how partial insertion or partial removal of the capillary 35 does not necessarily result in the gas flow being stopped, as the ball valve 50 may not yet seal the axial bore 30. Nevertheless, a gas flow reduction is seen. The reduced gas flow streams around the end portion 41 of the jet disrupter 40, which is arranged downstream.

The choice of the metal for the jet disruptor 40 is not limited to a specific composition (although spring steels may be beneficial), but in a preferred embodiment, Duratherm® 600 hard (sold by VACUUMSCHMELZE GmbH & Co. KG), Inconel® 718 hard (sold by Special Metals Corporation) or Inconel® 750 (sold by Special Metals Corporation) may be used, which are thermally resilient. This will be discussed further below.

A number of preferable and/or optional features in respect of the generalized aspect discussed above will now be described. For example, the configuration of the jet disruptor to disrupt gas flow only when the capillary tube is not fully inserted may be a result of one or more of the jet disruptor: shape; dimensions; movement (particularly with respect to the capillary); and position. Preferably, the jet disruptor is configured to retract from a position to disrupt gas flow between the axial bore and the downstream aperture, when the capillary tube is fully inserted through the axial bore. In other words, the jet disruptor may be in a disrupting position when the capillary tube is not fully inserted through the axial bore and is retracted from this disrupting position when the capillary tube is fully inserted through the axial bore. Additionally or alternatively, the jet disruptor may be arranged to rest in a (disrupting) position to disrupt gas flow between the axial bore and the downstream aperture and resiliently biased against displacement from the position upon insertion of the capillary tube through the axial bore. Such a resilient bias may be provided by a spring device or equivalent. Insertion of the capillary tube through the axial bore may then cause displacement away from the disrupting position, with no disruption advantageously being provided when the capillary tube is fully inserted through the axial bore.

In the preferred embodiments, the jet disruptor comprises (or is formed of) a sheet metal strip. For example, a first end of the sheet metal strip of the jet disruptor may be affixed to the support assembly (for instance, a heated block of the support assembly, as discussed below). In this way, a portion of the sheet metal strip distal the first end may be configured to disrupt gas flow when the capillary tube is not fully inserted through the axial bore. The portion of the sheet metal strip distal the first end is beneficially pushed away or displaced when the capillary tube is fully inserted through the axial bore. In embodiments, an end of the axial bore may be bevelled (or equivalently, a portion of the support structure defining the axial bore may be shaped such that the end of the axial bore is bevelled). Then, the sheet metal strip of the jet disruptor is optionally arranged to lie flat over the bevelled end of the axial bore, when the capillary tube is not fully inserted through the axial bore. This may improve disruption of the gas flow when the capillary tube is not fully inserted. The jet disruptor may be resilient to a temperature of at least 200° C. and optionally to a temperature of at least 250° C., 300° C., 400° C., 500° C., 550° C. or 600° C. The materials described above for the jet disruptor may be resilient up to temperatures between 370° C. and 550° C. Stability at temperatures above 400° C. may be preferable for use in the interface for the ion sources, as the inlet capillary (or axial bore) may reach this temperature.

Beneficially, the support assembly comprises a heated block around (and/or defining) the axial bore.

In preferred embodiments, the interface further comprises: a sealing valve, located along the axial bore and configured to seal the axial bore when the capillary tube is removed. In embodiments, the sealing valve is provided along the axial bore upstream of the jet disruptor (or equivalently, the jet disruptor is between the sealing valve and the downstream aperture). Optionally, the sealing valve comprises (or is) a ball valve or an electronically controlled valve.

Preferably, the axial bore defines an axis that is offset from an axis through the downstream aperture that is perpendicular to a plane of the downstream aperture. The axes are advantageously offset in a direction perpendicular to the axis of the axial bore and/or the axis through the downstream aperture. Preferably, the axes are parallel.

Optionally, the interface further comprises an ion funnel, arranged between the axial bore and the downstream aperture (particularly, in the interface vacuum chamber). The ion funnel is preferably configured so as to direct ion flow towards the downstream aperture of the interface vacuum chamber.

In embodiments, the interface further comprises a vacuum pumping arrangement, arranged to cause a pressure between the axial bore and the downstream aperture to be lower than atmospheric pressure. The vacuum pumping arrangement may additionally or alternatively be arranged to cause a first pressure in the interface vacuum chamber, below atmospheric pressure and to cause a second pressure in a chamber downstream the interface, below the first pressure. In other words, the interface and downstream chamber may be differentially pumped. An ion optical device, for example an ion guide, ion trap, ion filter or mass selection device may be provided in the downstream chamber. The ion optical device may be a quadrupole device. Further generalized and/or specific features will be discussed below.

Figure 4A:
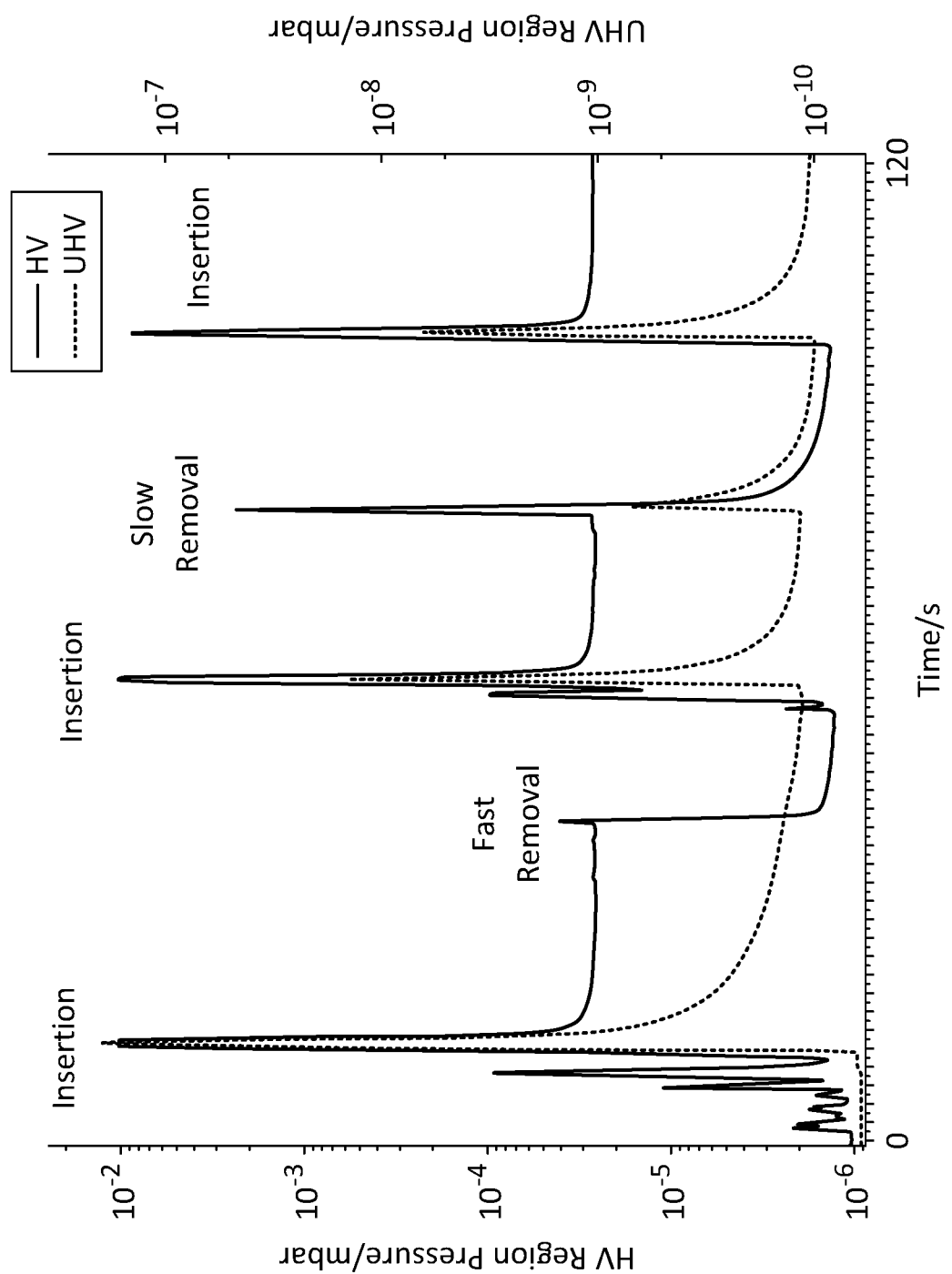
FIGS. 4a and 4b show plots of pressure against time during insertion and removal of a capillary to an interface of a mass spectrometer (4a) without a jet disruptor and (4b) with a jet disruptor.
Figure 4B:
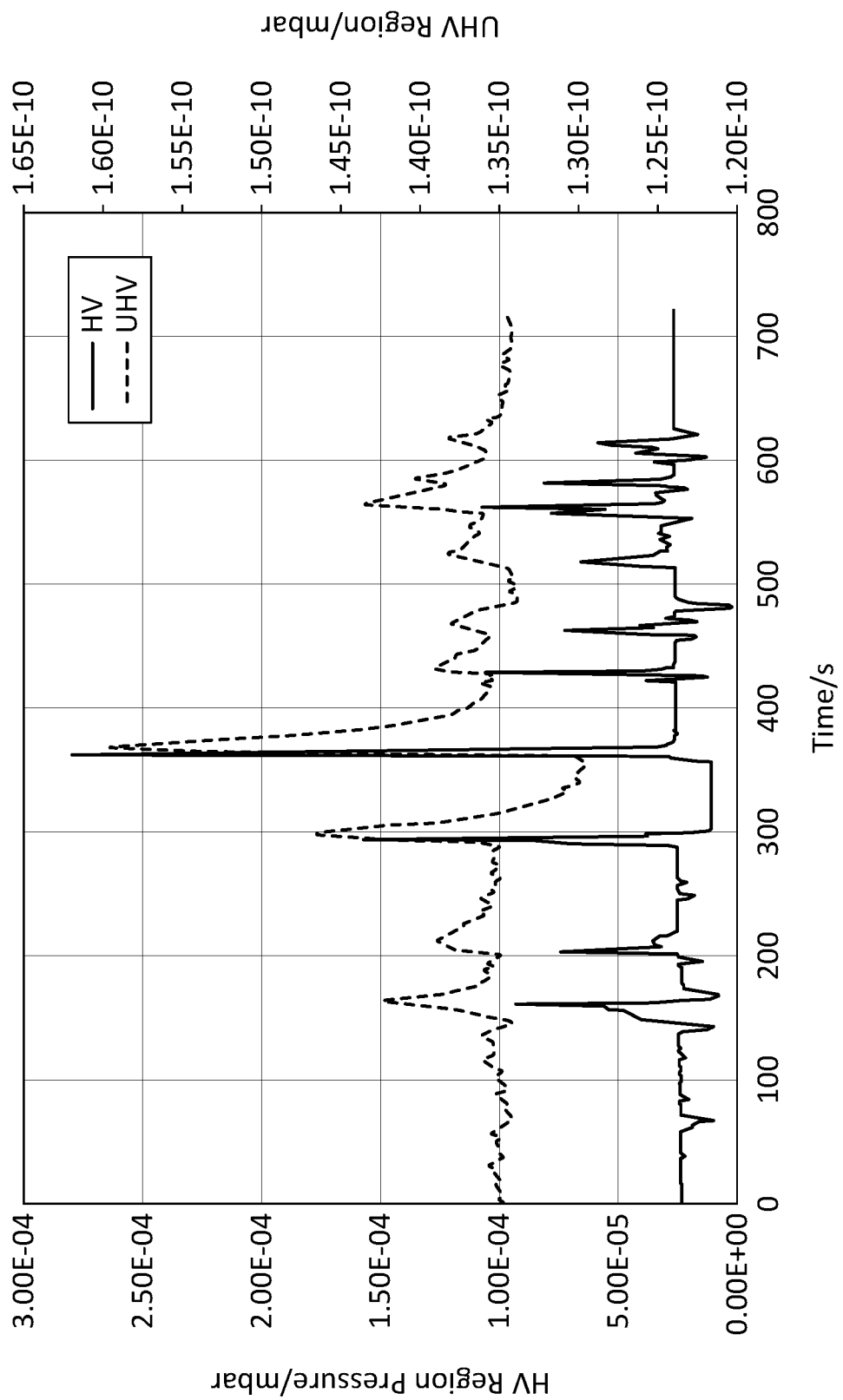

Referring now to FIG. 4, there are shown plots of pressure against time during insertion and removal of a capillary to an interface of a mass spectrometer (a) without a jet disruptor and (b) with a jet disruptor. These plots illustrate the pressure changes experimentally measured within differentially pumped vacuum regions downstream of the downstream aperture of the interface vacuum chamber during insertion and removal of the capillary, before and after the application of the jet disruptor according to this disclosure. It can be seen that without the jet disruptor (a), pressure spikes to levels that potentially require reestablishment of the vacuum, but with the jet disruptor installed (b), these spikes were effectively eliminated.

It will be appreciated that variations to the foregoing design can be made while still falling within the scope of the disclosure. For example, an alternative to the jet disruptor 40 shown in FIG. 1 would be to place a valve, such as the ball valve 50 shown in FIG. 1, to the downstream end of the axial bore 30, so minimising the period the capillary may retract before the valve closes. In other words, the functions of the sealing valve and jet disruptor could be combined to close the orifice and disrupt the jet at the same time. This is less preferred, as it may be significantly more expensive than the jet disruptor 40 according to FIG. 1 and can have difficulties with mechanical space (since the size and positioning of the combined sealing valve and jet disruptor may not efficiently fit at the downstream end of the axial bore 30). It may also require that the capillary 35 move to a sub-optimal position for ion transmission to accommodate the combined sealing valve and jet disruptor in the limited space of the support assembly.

In accordance with generalized embodiments of the disclosure, as discussed herein, it may be considered that the jet disruptor is or forms part of a sealing valve. In such embodiments, the combined jet disruptor and sealing valve may be located towards (or at) the end of axial bore nearest the downstream aperture.

Other alternatives to the jet disruptor 40 shown in FIG. 1 may also be considered by the skilled person. For example, these may be or comprise a suspended object that can be moved between the capillary and the downstream aperture (exit orifice) when the capillary is not fully inserted in the axial bore of the support assembly. The suspended object might be motorised and moved manually, or even automatically via a sensor recording the capillary position. As an alternative to the spring devices, the weight of the jet disruptor might apply a force on the jet disruptor by gravity. When the capillary tube is inserted again, a force against the weight of the disruptor is provided, either by the capillary tube or by an additional mechanism.

Variants on a jet disruptor formed of a metal strip (cut from a metal sheet, for instance) or similar material and/or structure may also be considered. For instance, the bent end of such a jet disruptor may be connected via a movable joint with the longer straight section of the jet disruptor. In that case, the bent section may be formed to act as a shutter for quickly closing the end of the capillary tube when the capillary tube is retracted. In this respect or otherwise, shaping of one or more parts of the jet disruptor to match a shape of the end of the capillary tube may be considered. For example, the bent section of the jet disruptor may be shaped to fit over the capillary tube (specifically its end). A particular example may be when the end of the capillary tube is tapered or slanted, such that the bent end of the jet disruptor may fit better over the end of the capillary tube. In some embodiments, the jet disruptor need not have a bent end or may be bent differently from that shown in the embodiments described above. The material for the jet disruptor can be varied, for example to comprise spring steel and/or other materials (particularly that may have a resilience to deformation and/or high temperature, as discussed above).

Some specific points should be noted about atmospheric pressure ion sources. As noted previously, depending on the ion source design, the range of pressure may deviate somewhat from that of the surrounding atmosphere. Within this class of ion source, this range can typically deviate up to one degree of magnitude from the ambient atmospheric pressure, which is near $1\times10^5$ Pa (the exact standard value at an altitude of 0 m or sea level is 1.013, 25 hPa). For instance, the pressure of the ion source may be in the range of $1\times10^4$ Pa to $1\times10^6$ Pa. Preferably, the range deviates less than one power of magnitude from atmospheric pressure, for example such that the pressure is in the range of $3\times10^4$ Pa to $3\times10^5$ Pa. More typically, the pressure at which ions are generated in an atmospheric pressure source can be in the range of $3\times10^4$ Pa to $1\times10^6$ Pa.

Although an ESI source is shown in FIG. 1, in principle any ion source that may be coupled to a mass spectrometer via an atmospheric interface could be used. The major such ion sources include an Electrospray Ionization (ESI) source, an Atmospheric Pressure Chemical Ionization (APCI) source, an Atmospheric Pressure Matrix-assisted laser desorption/ionization (AP-MALDI) source, an Atmospheric Pressure Photoionisation (APPI) and a Heated Electrospray Ionization (HESI) source. Other, more niche types of ion sources, for instance a Desorption Electrospray Ionization (DESI) or paper spray ionization source, may also be used.

A ball valve represents a simple known automatic valve to act as a sealing valve. However, the skilled person could alternatively consider any electronically controlled valve with activation linked to the presence of the capillary, for instance a solenoid valve.

The ion funnel may be replaced or supplemented by any ion optical device in the vacuum region to move ions out of the gas jet during normal operation, particularly when the jet disruptor is retracted. Alternatives may include an S-Lens or basic deflector.

The jet disruptor according to the disclosure may be applied mass spectrometers using a wide range of mass analysers. The skilled person will consider, for example: a Time-of-Flight (TOF) analyser; a quadrupole mass analyser; a Fourier Transform Mass Spectrometry (FTMS) analyser; an ion trap mass analyser; a magnetic sector mass analyser; and a hybrid mass analyser.

As well as mass spectrometers, an interface according to the disclosure may also be applied to ion mobility spectrometers (in which, a drift tube or similar may be provided in or as a downstream chamber. Other ion-based spectrometry analysers may also be considered. The specific manufacturing details of the interface and/or mass spectrometer and associated uses, whilst potentially advantageous (especially in view of known manufacturing constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an analogue to digital convertor) means "one or more" (for instance, one or more analogue to digital convertor). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, for example in respect of the jet disruptor in conjunction with a sealing valve and/or an offset of the axial bore and downstream aperture. In particular, the preferred features of the disclosure are applicable to all aspects of the disclosure and may be used in any combination. Likewise, features described in non-essential combinations may be used separately (not in combination).

The invention claimed is:

1. An interface for receiving ions in a carrier gas from an atmospheric pressure ion source at a spectrometer that is configured to analyze the received ions at a lower pressure, the interface comprising:
   an interface vacuum chamber having a downstream aperture;
   a support assembly defining an axial bore arranged to allow a removable capillary tube to extend therethrough, ions being received from the atmospheric pressure ion source through the capillary tube and directed towards the downstream aperture;
   a jet disruptor positioned downstream from the axial bore and configured to disrupt gas flow between the axial bore and the downstream aperture only when the capillary tube is not fully inserted through the axial bore; and a sealing valve, located along the axial bore and configured to seal the axial bore when the capillary tube is removed.

2. The interface of claim 1, wherein the jet disruptor is configured to retract from a position to disrupt gas flow between the axial bore and the downstream aperture when the capillary tube is fully inserted through the axial bore.

3. The interface of claim 1, wherein the jet disruptor is arranged to rest in a position to disrupt gas flow between the axial bore and the downstream aperture and resiliently biased against displacement from the position upon insertion of the capillary tube through the axial bore.

4. The interface of claim 1, wherein the jet disruptor comprises a sheet metal strip.

5. The interface of claim 4, wherein a first end of the sheet metal strip of the jet disruptor is affixed to the support assembly so that a portion of the sheet metal strip distal the first end is configured to disrupt gas flow when the capillary tube is not fully inserted through the axial bore.

6. The interface of claim 5, wherein the portion of the sheet metal strip distal the first end is coupled to the first end by a movable joint.

7. An interface for receiving ions in a carrier gas from an atmospheric pressure ion source at a spectrometer that is configured to analyze the received ions at a lower pressure, the interface comprising:

an interface vacuum chamber having a downstream aperture;

a support assembly defining an axial bore arranged to allow a removable capillary tube to extend therethrough, ions being received from the atmospheric pressure ion source through the capillary tube and directed towards the downstream aperture; and a jet disruptor positioned downstream from the axial bore and configured to disrupt gas flow between the axial bore and the downstream aperture only when the capillary tube is not fully inserted through the axial bore, wherein the jet disruptor comprises a sheet metal strip, wherein an end of the axial bore is beveled and the sheet metal strip of the jet disruptor is arranged to lie flat over the beveled end of the axial bore when the capillary tube is not fully inserted through the axial bore.

8. The interface of claim 1, wherein the jet disruptor is resilient to a temperature of at least 200° C.

9. The interface of claim 1, wherein the sealing valve comprises a ball valve or an electronically controlled valve.

10. The interface of claim 1, wherein the axial bore defines an axis that is offset from an axis through the downstream aperture.

11. The interface of claim 1, further comprising:
an ion funnel arranged between the axial bore and the downstream aperture in the interface vacuum chamber so as to direct ion flow towards the downstream aperture.

12. The interface of claim 1, wherein the support assembly comprises a heated block around the axial bore.

13. The interface of claim 1, further comprising:
a vacuum pumping arrangement arranged to cause a pressure between the axial bore and the downstream aperture in the interface vacuum chamber to be lower than atmospheric pressure.

14. A spectrometer, comprising:
an atmospheric pressure ion source;
an interface for receiving ions in a carrier gas from the atmospheric pressure ion source in accordance with claim 1; and
a mass analyzer or ion mobility analyzer, downstream from the interface.

15. The spectrometer of claim 14, wherein the atmospheric pressure ion source comprises one or more of: an Electrospray Ionization (ESI) source; an Atmospheric Pressure Chemical Ionization (APCI) source, an Atmospheric Pressure Matrix-assisted laser desorption/ionization (AP-MALDI) source; an Atmospheric Pressure Photoionization (APPI) source and a Heated Electrospray Ionization (HESI) source.

16. The spectrometer of claim 14, wherein the spectrometer is a mass spectrometer and the mass analyzer comprises: a Time-of-Flight (TOF) analyzer; a quadrupole mass analyzer; a Fourier Transform Mass Spectrometry (FTMS) analyzer; an ion trap mass analyzer; a magnetic sector mass analyzer; or a hybrid mass analyzer.

17. The spectrometer of claim 14, further comprising:
a vacuum pumping arrangement, arranged to cause a first pressure in the interface vacuum chamber, below atmospheric pressure and to cause a second pressure in a chamber downstream the interface vacuum chamber, below the first pressure.

* * * * *